(12) United States Patent
Movshovich et al.

(10) Patent No.: US 6,940,560 B2
(45) Date of Patent: Sep. 6, 2005

(54) METHOD AND SYSTEM FOR PERFORMING PAL LUMA TWO LINE VERTICAL COMBING

(75) Inventors: Aleksandr M. Movshovich, Santa Clara, CA (US); Brad A. Delanghe, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/881,563

(22) Filed: Jun. 29, 2004

(65) Prior Publication Data

US 2004/0233335 A1 Nov. 25, 2004

Related U.S. Application Data

(63) Continuation of application No. 10/004,585, filed on Dec. 3, 2001, now Pat. No. 6,771,321.
(60) Provisional application No. 60/333,181, filed on Nov. 6, 2001.

(51) Int. Cl.[7] .............................................. H04N 9/78
(52) U.S. Cl. ...................................... 348/665; 348/667
(58) Field of Search ................................ 348/665, 663, 348/667, 712; H04N 9/78, 9/77

(56) References Cited

U.S. PATENT DOCUMENTS

| | | | | |
|---|---|---|---|---|
| 4,707,732 A | * | 11/1987 | Matono et al. | ............. 348/668 |
| 5,134,467 A | * | 7/1992 | Kim | ........................... 348/663 |
| 5,526,060 A | * | 6/1996 | Raby | .......................... 348/663 |
| 6,462,790 B1 | * | 10/2002 | Lowe et al. | ................ 348/665 |

* cited by examiner

Primary Examiner—Sherrie Hsia
(74) Attorney, Agent, or Firm—Sawyer Law Group LLP

(57) ABSTRACT

A method and system for performing combing for PAL luma data is disclosed. The combing is performed for a display having a plurality of lines. The display is capable of depicting a frame including a horizontal boundary having a top edge and a bottom edge. A top line of the plurality of lines is at the top edge of the horizontal boundary. A bottom line of the plurality of lines is at the bottom edge of the horizontal boundary. The method and system includes providing a feedback multiplexer, a line delay and a feed forward multiplexer. The feedback multiplexer has a first input, a second input and a first output. The first input is for receiving luma data for a current line. The line delay has a delay input and a delay output, the delay input coupled with the first output. The delay output is coupled with the second input. The feed forward multiplexer has a third input, a fourth input and a second output. The third input is coupled with the delay output. The fourth input is for receiving the luma data for the current line. The feedback multiplexer is controlled to provide fedback luma data from the second input to the first output when the current line is the top line and to provide the luma data for the current line from the first input to the first output otherwise. The feed forward multiplexer is controlled to provide next line luma data from the fourth input to the second output when the current line is the bottom line and to provide the luma data from the current line to the second output otherwise.

4 Claims, 5 Drawing Sheets

METHOD AND SYSTEM FOR PERFORMING PAL LUMA TWO LINE VERTICAL COMBING

CROSS-REFERENCE TO RELATED APPLICATION

This application is a continuation of application Ser. No. 10/004,585, filed Dec. 3, 2001, now U.S. Pat. No. 6,771,321 when is claiming under 35 USC 119(e) the benefit of provisional patent Application Ser. No. 60/333,811 filed on Nov. 6, 2001.

FIELD OF THE INVENTION

The present invention relates to graphics systems, and more particularly to a method and system for performing PAL luma two line vertical combing.

BACKGROUND OF THE INVENTION

In graphics systems, data for a particular frame includes both luma (luminance) and chroma (chrominance) data. In order to process the graphics data, the luma and chroma are separated. The mechanism used to separate the luma and chroma data depends upon the standard with which the data complies. One such standard is PAL. In PAL, luma and chroma data are carried predominantly at two different frequencies. In PAL, frequencies below 3.1 MHz are assumed to be luma. Thus, one conventional method for separating the luma and chroma data uses a band pass filter to remove the low frequency luma data from the chroma data. However, there is some crosstalk between the luma and chroma data. Consequently, some luma data will exist above 3.1 MHz and some chroma data resides below 3.1 MHz. In order to better separate the luma and chroma data, another process is used.

FIG. 1 depicts a high-level block diagram of a conventional system 10 for separating PAL luma and chroma data. Typically, luma and chroma data are carried predominantly at two different frequencies. The conventional system 10 includes a first line delay 16 and a second line delay 18, adder 20, a divide-by-two block 22 and a subtractor 24. Each line delay 16 and 18 provides a delay equal to one line being processed.

FIG. 2 depicts a conventional method 50 for separating PAL luma and chroma data utilizing conventional three-line combing. The conventional method 50 is generally used by the system 10. Consequently, the conventional method 50 is described in conjunction with the system 10. Referring to FIGS. 1 and 2, the method 50 and the system 10 assume that the data does not change radically from line to line. Thus, the method 50 and the system 10 approximate data for the current line using a previous line and a next line. A portion of the video signal is separated at the node 11, via step 51. Thus, a portion of the video signal is transmitted along the line 12, while another portion is transmitted along the line 14. The data is sent through two line delays 16 and 18, via step 52. The output of the second delay 18 is data for the previous line. The data at the node 17 between the line delays 16 and 18 is data for the current line. Data taken from the node 11 is data for the next line. The data for the previous, current and next lines are thus present in the system 10 because of the line delays 16 and 18.

The previous line and next line signals are combined, via step 53. Step 53 is performed by combining the signal from the line 12 with the signal being output by the second line delay 18 using the combiner 20. Because the signal from the second line delay 18 is two lines ahead of the signal taken from the node 11, chrominance data is approximately canceled out when the two signals are combined. The output of the combiner 20 is two times the luma data for the current line. Note that although the output of the combiner 20 is termed twice the luma data for the current line, the output actually approximates the twice luma data for the current line because the previous and next lines were used.

This data is then cut in half, using the divide-by-two block 22, via step 54. Thus, the output of the divide-by-two block 22 is the luma data for the current line. The luma data output by the divide-by-two block 22 is considered to be for the current line because data for the current line is taken from the node 17, between the line delays 16 and 18.

The luma data is then subtracted from the chroma data for the current line; via step 55. This step is performed using the subtractor 24. Consequently, the luma data and the chroma data can be output by the conventional system 10.

Although the conventional system 10 and method 50 function adequately in most cases, one of ordinary skill in the art will readily recognize that the conventional system 10 and method 50 do not work well at certain rough edges. FIG. 3 depicts a portion of a frame 60 in a display. The frame 60 includes such a boundary 90. The boundary 90 is between polygons 70 and 80. However, the boundary 90 could be between other items. The edge 90 is rough because the polygons 70 and 80 have very different colors. For example, the polygon 70 may be dark, while the polygon 80 may be light. The portion of the polygon 70 shown includes lines 61, 62 and 63. The portion of the polygon 80 shown includes lines 64, 65 and 66. The edge 90 is between lines 63 and 64.

Referring to FIGS. 1–3, the conventional system 10 and method 50 combine data for a previous line and a next line in order to obtain luma data, which is also used to obtain the chroma data. When line 62 is the current line, taken from node 17, line 61 is the previous line and line 63 is the next line. Consequently, the luma and chroma data output from the divide-by-two block 22 and the subtractor 24 are as desired. However, when line 63 is the current line taken from the node 17, line 62 is the previous line and line 64 is the next line. However, line 64 is part of the other polygon 80, taken from the other side of the edge 90. Consequently, when the line 64 is combined with the line 62, the resultant will not be close to the luma data for the current line. This is because the chroma data changes radically due to the boundary 90. In other words, the assumptions made for performing the conventional three-line combing of the method 50 no longer hold. As a result, the appearance of the frame near the boundary 90 is incorrect.

Accordingly, what is needed is a system and method for separating PAL luma and chroma data while reducing the incongruities introduced around rough boundaries. The present invention addresses such a need.

SUMMARY OF THE INVENTION

The present invention provides a method and system for performing combing for PAL luma data. The combing is performed for a display having a plurality of lines. The display is capable of depicting a frame including a horizontal boundary having a top edge and a bottom edge. A top line of the plurality of lines is at the top edge of the horizontal boundary. A bottom line of the plurality of lines is at the bottom edge of the horizontal boundary. The method and system comprise providing a feedback multiplexer, a line delay and a feed forward multiplexer. The feedback multiplexer has a first input, a second input and a first output. The first input is for receiving luma data for a current line. The line delay has a delay input and a delay output, the delay input coupled with the first output. The delay output is coupled with the second input. The feed forward multiplexer has a third input, a fourth input and a second output. The third input is coupled with the delay output. The fourth input is for receiving the luma data for the current line. The feedback multiplexer is controlled to provide fedback luma data from the second input to the first output when the current line is the top line and to provide the luma data for the current line from the first input to the first output otherwise. The feed forward multiplexer is controlled to provide next line luma data from the fourth input to the second output when the current line is the bottom line and to provide the luma data from the current line to the second output otherwise.

According to the system and method disclosed herein, the present invention provides a method and system for performing two-line combing that reduces artifacts of separation of PAL luma and chroma data.

DETAILED DESCRIPTION OF THE INVENTION

The present invention relates to an improvement in graphics systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for performing combing for PAL luma data. The combing is performed for a display having a plurality of lines. The display is capable of depicting a frame including a horizontal boundary having a top edge and a bottom edge. A top line of the plurality of lines is at the top edge of the horizontal boundary. A bottom line of the plurality of lines is at the bottom edge of the horizontal boundary. The method and system comprise providing a feedback multiplexer, a line delay and a feed forward multiplexer. The feedback multiplexer has a first input, a second input and a first output. The first input is for receiving luma data for a current line. The line delay has a delay input and a delay output, the delay input coupled with the first output. The delay output is coupled with the second input. The feed forward multiplexer has a third input, a fourth input and a second output. The third input is coupled with the delay output. The fourth input is for receiving the luma data for the current line. The feedback multiplexer is controlled to provide fedback luma data from the second input to the first output when the current line is the top line and to provide the luma data for the current line from the first input to the first output otherwise. The feed forward multiplexer is controlled to provide next line luma data from the fourth input to the second output when the current line is the bottom line and to provide the luma data from the current line to the second output otherwise.

The present invention will be described in terms of a system having certain components and a method having certain steps. However, one of ordinary skill in the art will readily recognize that the present invention will operate effectively for other systems having other and/or different components and methods having additional and/or different steps.

Figure 4:
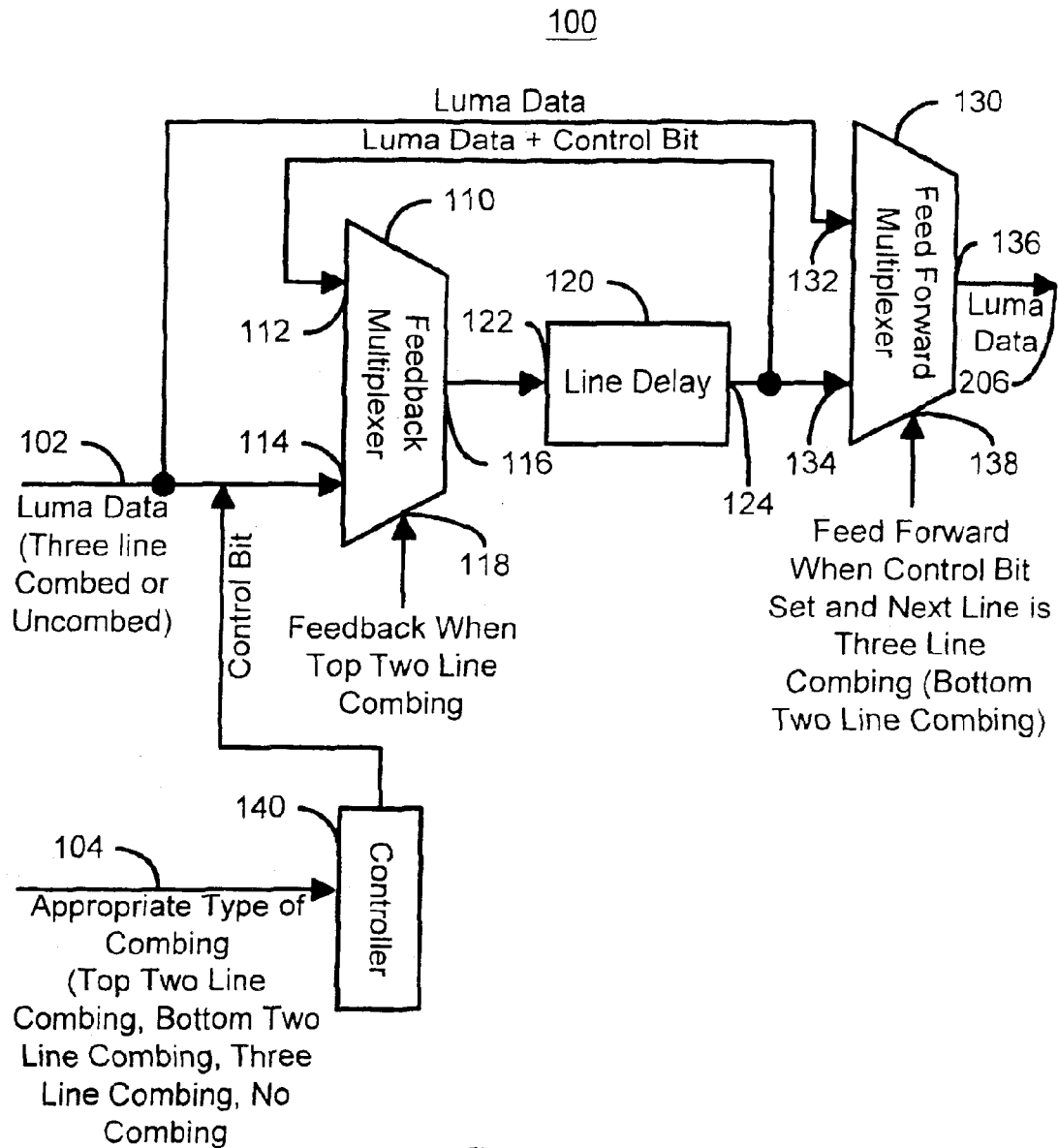
FIG. 4 is a block diagram of one embodiment of a system in accordance with the present invention for performing two line combing for PAL luma data.

To more particularly illustrate the method and system in accordance with the present invention, refer now to FIG. 4, depicting one embodiment of a system 100 in accordance with the present invention for performing two line combing for PAL luma data. The system 100 includes feedback multiplexer 110, line delay 120 and feed forward multiplexer 130. The system 100 also may include controller 140 for setting a control bit. The feedback multiplexer 110 includes inputs 112 and 114 and output 116. The line delay 120 delays the signal by a single line of the frame and includes input 122 and output 124. The feed forward multiplexer 130 includes two inputs 132 and 134 and an output 136. The inputs 114 and 132 of the feedback multiplexer 110 and feed forward multiplexer 130, respectively, are coupled to the input 102 of the system 100. The input 112 of the feedback multiplexer and the input 114 of the feed forward multiplexer are coupled to the output of the line delay 120. The output of the feedback multiplexer 116 is coupled to the input of the line delay 120. The controller 140 is coupled to the input 114 of the feedback multiplexer 110. The controller 140 sets a control bit based upon an appropriate type of combing provided to the input 104 of the system 100.

Figure 1:
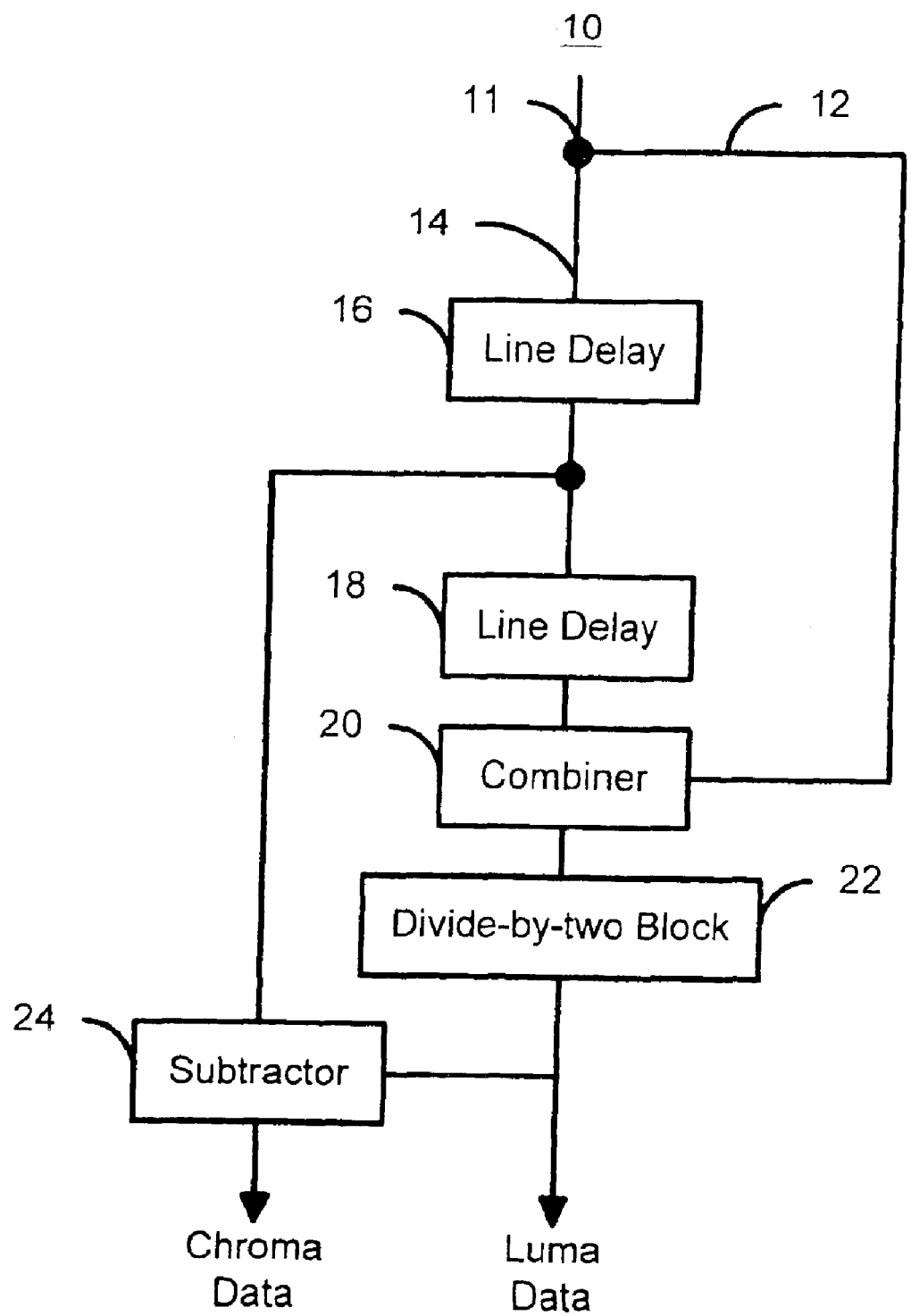
FIG. 1 is a high-level block diagram of a conventional system for separating PAL luma data from PAL chroma data.
Figure 2:
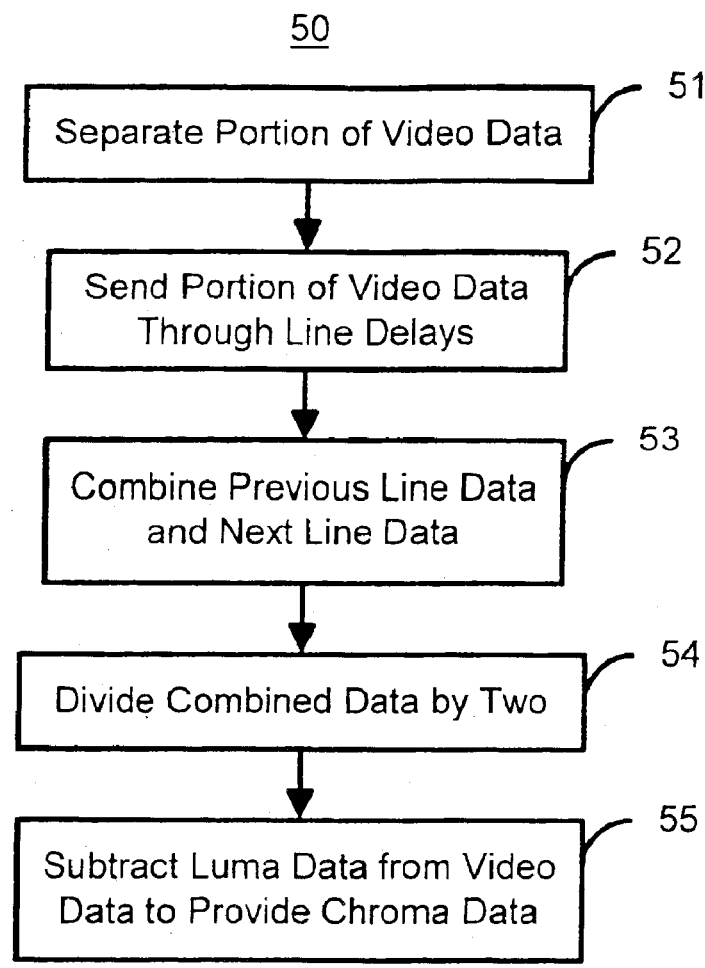
FIG. 2 is a high-level flow chart block diagram of conventional method for separating PAL luma data from PAL chroma data.
Figure 3:
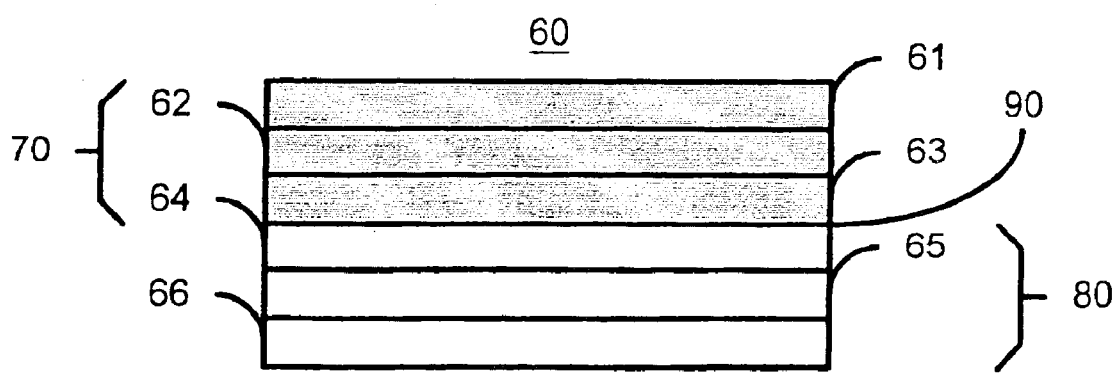
FIG. 3 is a diagram of a portion of a frame in a display.
Figure 5:
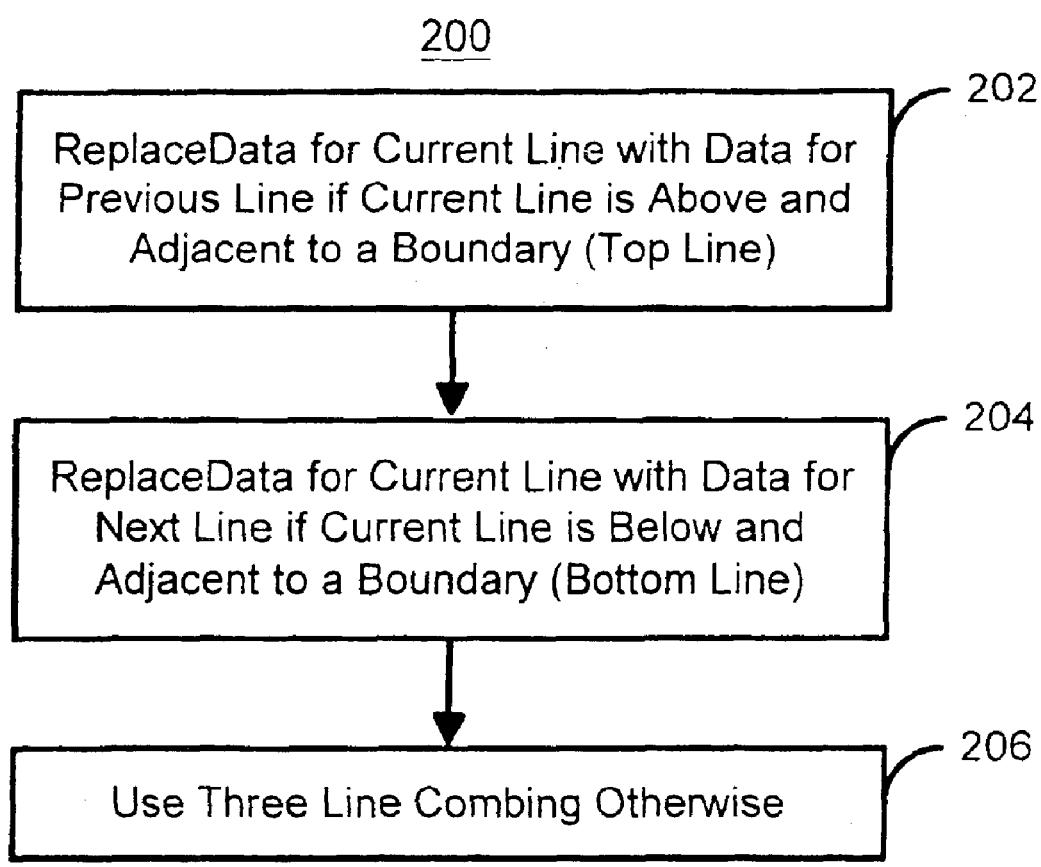
FIG. 5 is a high-level flow chart of one embodiment of a method in accordance with the present invention for performing two line combing for PAL luma data.

FIG. 5 is one embodiment of a high-level flow chart of a method 200 in accordance with the present invention for performing two line combing for PAL luma data. The method 200 is preferably performed by the system 100. Consequently, the method 100 is described in connection with the system 100 depicted in FIG. 4. Referring to FIGS. 4 and 5, luma data for a previous line is used in lieu of luma data for a current line if the current line is a top line, via step 202. A top line is the line above and adjacent to a boundary. For example, in FIG. 3, the top line is line 63. Referring to FIGS. 3, 4, and 5, step 202 would use luma data for line 62 in lieu of line 63. Step 202 is preferably performed using the feedback multiplexer 110. When the line being input to the input 114 of the feedback multiplexer 110 is a top line, the feedback multiplexer 110 selects the other, fedback data from the input 112. This data has passed through the line delay 120 and is thus from a previous line. This, fedback data is forwarded through the system 100 in lieu of the data received by the input 114 of the multiplexer 110.

For a bottom line, luma data from the next line is used instead of luma data for a bottom line, via step 204. A bottom line is below and adjacent to a boundary such as the boundary 90. Step 204 is preferably performed using the feed forward multiplexer 130. When the data for the line provided to the input 134 of the feed forward multiplexer 130 is for a bottom line, the feed forward multiplexer 130 selects the data being input via the input 132 for forwarding to the output 136. This data has not passed through the line delay 120 and is thus from the next line. In other cases, system 100 forwards the data for the current line, via step 206.

Figure 6:
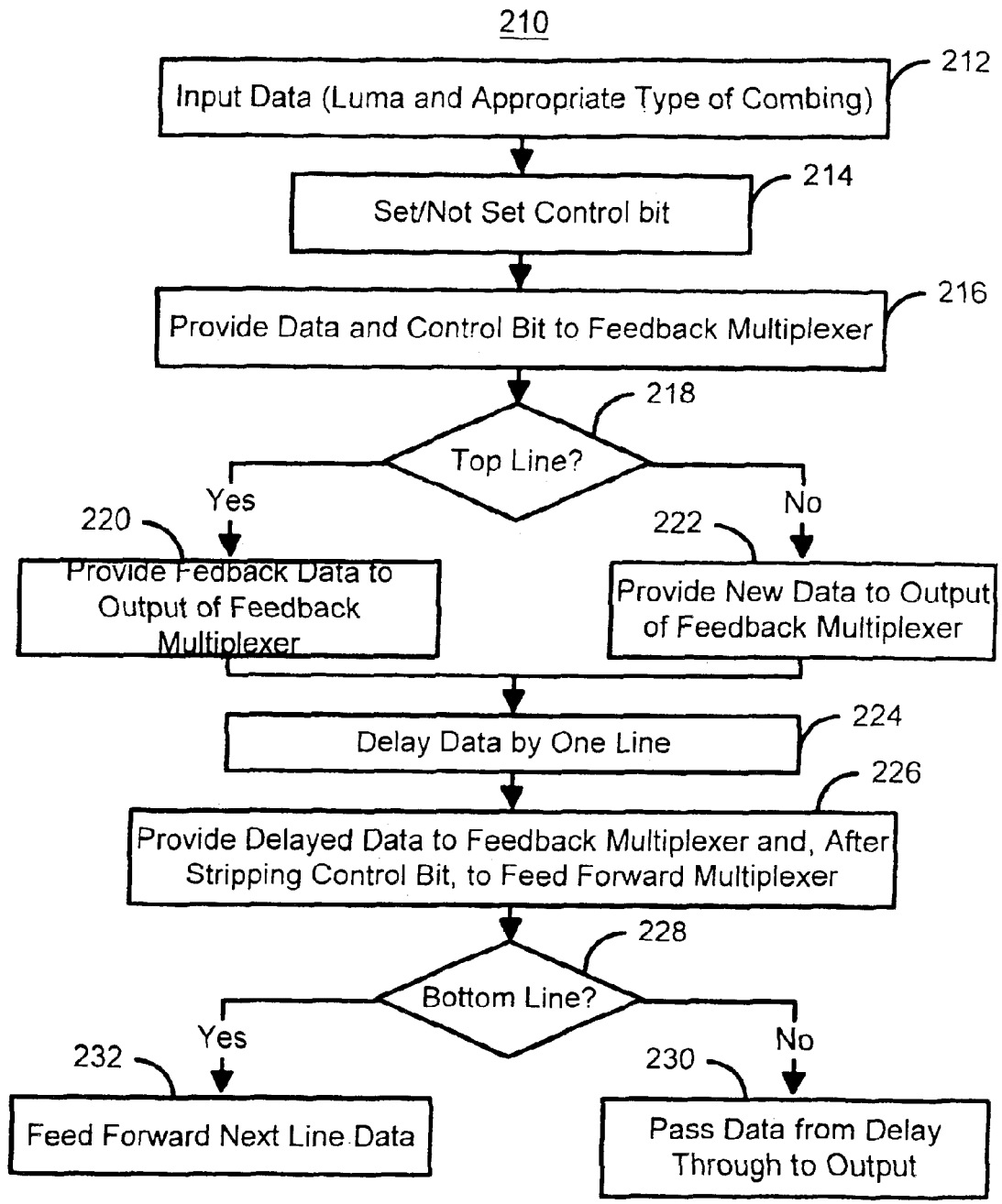
FIG. 6 is a flow chart of one embodiment of a method in accordance with the present invention for performing two line combing for PAL luma data.

FIG. 6 is a more detailed flow chart of one embodiment of a method 210 in accordance with the present invention for performing two line combing for PAL luma data using the system 100. The method 210 is described in conjunction with the system 100. Referring to FIGS. 4 and 6, the system 100 receives the input data through input 102 and an indication of the appropriate type of combing through input 104 via step 212. The appropriate type of combing may be conventional three line combing, top two line combing, bottom two line combing or no combing. Top two line combing is used for the top line. Bottom two line combing is appropriate for the bottom line, as defined above. Conventional three line combing may be used in other cases. The data input through the input 102 is either combed data or horizontal luma data. The combed data has preferably undergone conventional three line combing.

A control bit is then either set or not set, depending upon the appropriate type of combing provided to input 104, via step 214. Step 214 is preferably performed by the controller 140, but could be performed in another manner by another component. The control bit is for the feed forward multiplexer 130. The control bit is set if no combing is appropriate for the system 100 or if bottom two line combing is appropriate. The control bit and luma data (combed luma data or simply horizontal luma data) are provided to the input 114 of the feedback multiplexer 110, via step 216.

It is then determined whether the luma data that is provided to the feedback multiplexer 110 through input 114 is from a top line, via step 218. Based on this determination, the control signal 118 controls the feedback multiplexer 110. If the data from the input 114 is for a top line (above a boundary), then data that is discarded. Instead, the data provided to the input 112, which was fed back from the output of the line delay 120, is provided to the output 116 from the feedback multiplexer 110, via step 220. Otherwise, the data provided to the input 114 is provided to the output 116, via step 222. Thus, if the data provided to the input 102 of the system 100 and thus to the input 114 of the feedback multiplexer 110 is not from a top line, the data will be forwarded by the feedback multiplexer 110. If, however, the data provided to the input 102 of the system 100 and thus to the input 114 of the feedback multiplexer 110 is from a top line, then data from the previous line will be used instead. Data from the previous line is the data fed back from the output 124 of the line delay 120 to the input 112 of the feedback multiplexer 110.

The data output by the feedback multiplexer 110, which includes both luma data and the control bit, undergoes a one line delay, via step 224. Step 224 is performed by sending the data output by the feedback multiplexer 110 to the line delay 120. The delayed data including both the control bit and the luma data is fed back to the feedback multiplexer 110 and the control bit is stripped off and the remaining luma data provided to the feed forward multiplexer 130, via step 226. It is determined whether the luma data provided to the feed forward multiplexer 130 from the line delay 120 via the input 134 is a bottom line, via step 228. If the luma data input from the line delay 120 is not for a bottom line, then the data is output, via step 230. If the luma data input from the line delay 120 is for the bottom line, then data for the next line is fed forward, via step 232. Step 232 is performed by selecting the data provided to the input 132 from the system input 1-2 when the luma data is for a top line. In a preferred embodiment, steps 230 and 232 are performed by forwarding data for the next line when the control bit is set and the appropriate type of combing for the next line is three line combing and outputting data from the line delay 120 otherwise.

Thus, the system 100 and methods 200 and 210 perform two line combing for appropriate portions of a frame. For example, referring back to FIG. 3, the system 100 and methods 200 and 210 perform two line combing for the lines 63 and 64. In particular, the system 100 and methods 200 and 210 will simply pass through data for line 62 because three line combing is appropriate for line 62. However, line 63 is a top line, a line above and adjacent to a boundary 90. Consequently, the system 100 and methods 200 and 210 perform two line combing for the line 63. In particular, the system 100 and methods 200 and 210 discard the data for line 63, and utilize data from line 62 instead. Similarly, line 64 is a bottom line, a line below and adjacent to the boundary 90. Consequently, the system 100 and methods 200 and 210 perform two line combing for the line 64. In particular, the system 100 and methods 200 and 210 discard data for the line 64 and utilize data from the line 65. For the line 65, the system 100 and methods 200 and 210 simply pass the luma data through. As a result, the system 100 and methods 200 and 210 allow the luma data which may have undergone three line combing and that are not adjacent to a boundary, such as the boundary 90, to pass through. However, the system 100 and methods 200 and 210 perform the appropriate type of two line combing for lines that are adjacent to boundaries.

Because the system 100 and methods 200 and 210 perform two line combing for top and bottom lines, the luma data at one side of a boundary is not corrupted by luma data from the other side of the boundary that would otherwise be introduced by three line combing. As a result, artifacts introduced by cross contamination from data on the opposite side of the boundary can be reduced or eliminated. Consequently, the quality of the frame displayed is improved.

A method and system has been disclosed for performing two-line combing for PAL luma data. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for performing combing for PAL luma data for a display having a plurality of lines, the display capable of depicting a frame including a horizontal boundary having a top edge and a bottom edge, a top line of the plurality of lines at the top edge of the horizontal boundary, a bottom line of the plurality of lines at the bottom edge of the horizontal boundary, the system comprising:

a feedback means having a first input, a second input and a first output, the first input receiving luma data for a current line;

a line delay having a delay input and a delay output, the delay input coupled with the first output, the delay output coupled with the second input;

a feed forward means having a third input, a fourth input and a second output, the third input coupled with the delay output, the fourth input receiving the luma data for the current line, the feedback means being controlled to provide fedback luma data from the second input to the first output when the current line is the top line and to provide the luma data for the current line from the first input to the first output otherwise, the feed forward means being controlled to provide next line luma data from the fourth input to the second output when the current line is the bottom line and to provide the luma data from the current line to the second output otherwise.

2. The system of claim 1 further comprising:

a first system input, coupled with the first input of the feedback means and the fourth input of the feed forward means, for receiving the luma data; and a second system input, coupled with the first input of the feedback means, for receiving an appropriate combing type, the appropriate combing type being a three line combing, a bottom two line combing for the bottom line, or a top two line combing for the top line.

3. The system of claim 2 further comprising:

a controller coupled to the second system input and the first input of the feedback means, the controller for setting or not setting a control bit, the control bit being provided to the first input of the feedback means, the control bit being set when the current line is the top line or when combing is not performed.

4. The system of claim 3 wherein the feed forward means provides the next line luma data from the fourth input to the second output when the control bit is set and a next line utilizes the three line combing.

* * * * *